United States Patent
Fujiwara et al.

(10) Patent No.: US 7,669,060 B2
(45) Date of Patent: Feb. 23, 2010

(54) DATA PROCESSING APPARATUS

(75) Inventors: Katsuyoshi Fujiwara, Osaka (JP); Yuji Okamoto, Kyoto (JP); Naofumi Ueda, Kyoto (JP); Syouichirou Yoshiura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 621 days.

(21) Appl. No.: 11/001,023

(22) Filed: Dec. 2, 2004

(65) Prior Publication Data

US 2005/0125676 A1  Jun. 9, 2005

(30) Foreign Application Priority Data

Dec. 5, 2003  (JP)  ............... 2003-408037

(51) Int. Cl.
G06F 21/02 (2006.01)
G06F 21/22 (2006.01)
G06F 21/24 (2006.01)

(52) U.S. Cl. .................... 713/193; 726/28; 726/29; 358/1.14; 358/1.16

(58) Field of Classification Search ............... 713/193; 726/28, 29; 358/1.14, 1.16
See application file for complete search history.

(56) References Cited

U.S. PATENT DOCUMENTS 7,251,049 B2 * 7/2007 Kurokawa et al. ......... 358/1.15
7,349,118 B2 * 3/2008 Zipprich et al. ............. 358/1.16
2001/0025343 A1 * 9/2001 Chrisop et al. .............. 713/193
2002/0169971 A1 * 11/2002 Asano et al. ................ 713/193
2003/0184805 A1 * 10/2003 Kurokawa et al. .......... 358/1.18
2004/0093598 A1 * 5/2004 Haga et al. ................. 717/173

FOREIGN PATENT DOCUMENTS

| JP | 1-256068 A | 10/1989 |
|---|---|---|
| JP | 6-178041 A | 6/1994 |
| JP | 7-28365 A | 1/1995 |
| JP | 9-223061 A | 8/1997 |
| JP | 2000-43384 A | 2/2000 |
| JP | 2000-187419 A | 7/2000 |
| JP | 2003-150360 A | 5/2003 |
| JP | 2004-106503 A | 4/2004 |

* cited by examiner

*Primary Examiner*—Jung Kim
*Assistant Examiner*—Izunna Okeke
(74) *Attorney, Agent, or Firm*—Birch, Stewart, Kolasch & Birch, LLP

(57) ABSTRACT

In a data processing apparatus which performs an output process and a protection process on data stored in a data storage section, and executes user verification when verification data to be used in verification at a time of accepting setting about the protection process is stored in a verification data storage section, execution of a data protection process is permitted or inhibited according to whether the verification data is stored in the verification data storage section or not. As the protection process is executed when user verification is carried out, the security on data protection is kept at a high level.

10 Claims, 12 Drawing Sheets

FIG. 10A

ACTIVATION OF SECURITY CONFIRMED.
SET PASSWORD OF THE MANAGER OF THE MACHINE.

| \* \* \* \* | SETTING DONE |

FIG. 10B

SET PASSWORD IS INCORRECT.
SET ANOTHER PASSWORD.

| \* \* \* \* | SETTING DONE |

FIG. 10C

PASSWORD IS SET.
OPERATION OF SECURITY KIT PERMITTED.

OK

DATA PROCESSING APPARATUS

CROSS-REFERENCE TO RELATED APPLICATIONS

This Nonprovisional application claims priority under 35 U.S.C. §119(a) on Patent Application No. 2003-408037 filed in Japan on Dec. 5, 2003, the entire contents of which are hereby incorporated by reference.

BACKGROUND OF THE INVENTION

The present invention relates to a data processing apparatus which temporarily stores image data input from an image reading section, such as a scanner, or image data input via a communication circuit, such as a LAN or the Internet, into a memory device, records the stored image data on a recording medium, such as a copy sheet, and sends the image data to outside by facsimile communication or by data communication, and, more particularly, to a data processing apparatus which enhances the security of image data temporarily stored.

There is an image processing apparatus (data processing apparatus) with an electronic filing function which optically scans and reads an original to be copied as image data, temporarily stores the scanned image data into a storage medium, such as a hard disk, and reads out desired image data from the storage medium and prints the image data on a recording sheet according to an instruction (see e.g., Japanese Patent Application Laid-Open No. H6-178041(1994)).

The image processing apparatus with such an electronic filing function manages the storage locations or so on the storage medium at the time of storing image data and the storage locations or so on the storage medium at the time of reading image data according to, for example, a FAT (File Allocation Table). In the FAT, data numbers are allocated to individual pieces of data to be stored in the storage medium, and the storage locations of individual pieces of image data on the storage medium are specified as reference values in the FAT are determined by the data numbers.

The FAT is updated every time image data to be managed is newly stored. For image data whose printing has been done, when management information about the image data is erased from the FAT, FAT-based reading cannot be carried out. Therefore, leakage or so of image data can be prevented by erasing management information about the image data whose printing has been done from the FAT.

Even when management information about the image data whose printing has been done is erased from the FAT, however, the image data stays stored in the storage medium (e.g., a hard disk) unless the data is overwritten with another image data or so. It is therefore possible to remove the storage medium from the image processing apparatus, and read and acquire the image data left stored from the storage medium illegitimately.

In this respect, the following technologies have been proposed in consideration of the security of image data against information leakage or illegitimate usage. For example, the technologies include an image processing apparatus which is permitted to be used when a user is verified (Japanese Patent Application Laid-Open No. H7-28365(1995)), an image processing apparatus which buries specific information in image data to be output so that the route of the image data can be traced (Japanese Patent Application Laid-Open No. 2000-187419), an image processing apparatus which encrypts image data and stores the encrypted image data (Japanese Patent Application Laid-Open No. H1-256068(1989)), and an image processing apparatus which automatically erases image data from a storage medium when the image data becomes unnecessary (Japanese Patent Application Laid-Open No. H9-223061(1997)). Those technologies are said to be able to prevent leakage or illegitimate usage of image data remaining in the apparatus.

There is also a data security kit available as a commercial product which prevents leakage or illegitimate usage of image data from an electronic filing function by encrypting or erasing image data stored in a storage medium, such as a hard disk, or erasing image data stored in a memory. Such a data security kit can be adapted to the electronic filing function, and can be installed later in various kinds of apparatus, not to mention an image processing apparatus having an electronic filing function.

BRIEF SUMMARY OF THE INVENTION

Various kinds of settings on the encryption or the erasure are often done through an operation panel of an image processing apparatus (data processing apparatus). For the purpose of enhancing the security against information leakage or illegitimate usage, however, at the time various kinds of settings on encryption or the erasure are accepted, verification is normally done using verification data, such as a password. There may be a user who does not set a password or a user who uses a default password which is easy to predict, such as "0000". When password verification is not functioning properly, there is a risk that various kinds of settings on a protection process, such as encryption or erasure, are changed illegitimately, and the level of the security drops.

The present invention has been made in view of the situation, and aims at providing a high-security data processing apparatus which permits execution of a data protection process when verification at the time of accepting or receiving settings on the protection process is executed.

It is another object of the present invention to provide a high-security data processing apparatus which permits execution of a data protection process when verification data is changed from the default one.

It is a further object of the present invention to provide a high-security data processing apparatus which executes verification upon acceptance of settings using verification data stored in a verification data storage section at the time of performing a data protection process.

It is a still further object of the present invention to provide a high-security data processing apparatus which permits execution of a data protection process when invalid verification data is not used.

It is a yet still further object of the present invention to provide a high-security data processing apparatus which prevents the use of a default password or an invalid password.

A data processing apparatus according to the present invention receives and stores data into a data storage section, performs an output process and a protection process on the data stored in the data storage section, and executes verification when verification data to be used in verification at a time of accepting setting about the protection process is stored in a verification data storage section, and includes protection control means for permitting or inhibiting execution of the protection process according to whether the verification data is stored in the verification data storage section or not. The protection control means permits execution of the protection process when the verification data is stored in the verification data storage section, and inhibits execution of the protection process when the verification data is not stored in the verification data storage section. The provision of the protection control means, which permits execution of the protection process when the verification data is stored in the verification data storage section, allows the protection process to be executed when verification upon acceptance of settings on protection process. This makes it possible to keep the security level of data protection high.

A data processing apparatus according to the present invention receives and stores data into a data storage section, performs an output process and a protection process on the data stored in the data storage section, and executes verification at a time of accepting setting about the protection process by using default verification data stored in a verification data storage section or verification data changed from the default verification data and stored in the verification data storage section, and includes protection control means for permitting or inhibiting execution of the protection process according to whether the verification data stored in the verification data storage section has been changed from the default one. The default verification data or verification data changed from the default one is stored in the verification data storage section. The protection control means permits execution of the protection process when the verification data has been changed from the default verification data, and inhibits execution of the protection process when the verification data has not been changed from the default verification data. The provision of the protection control means, which permits execution of the protection process when the verification data, stored in the verification data storage section, has been changed from the default one, allows the protection process to be executed when verification data is changed from the default one. This makes it possible to keep the security level of data protection high.

A data processing apparatus according to the present invention receives and stores data into a data storage section, performs an output process and a protection process on the data stored in the data storage section, and executes verification when verification data to be used in verification at a time of accepting setting about the protection process is stored in a verification data storage section, and includes reception means for receiving verification data when no verification data is not stored in the verification data storage section before execution of the protection process, storage control means for storing the verification data, received by the reception means, into the verification data storage section, and protection control means for permitting or inhibiting execution of the protection process according to whether the verification data received by the reception means is stored in the verification data storage section or not. When no verification data is stored in the verification data storage section before execution of the protection process, verification data is received by the reception means. The verification data received by the reception means is stored in the verification data storage section in principle by the storage control means. The protection control means permits execution of the protection process when verification data is stored in the verification data storage section, and inhibits execution of the protection process when no verification data is stored in the verification data storage section. As the reception means, which receives the verification data when no verification data is stored in the verification data storage section before execution of the protection process, the storage control means, which stores the verification data, received by the reception means, into the verification data storage section, and the protection control means, which permits execution of the protection process when the verification data is stored in the verification data storage section, are provided, verification upon acceptance of settings on protection process is carried out when the protection process is to be executed. This can keep the security level of data protection high.

The data processing apparatus according to the present invention is designed in such a way as to further include an invalid data storage section which stores invalid data having invalid verification data registered therein, and decision means for deciding whether the verification data received by the reception means is invalid or not based on the invalid data. When it is decided that the verification data received by the reception means is invalid, the storage control means does not store the received verification data into the verification data storage section. Invalid data in which invalid verification data is registered is stored in the invalid data storage section. The decision means decides whether the verification data received by the reception means is invalid or not based on the invalid data stored in the invalid data storage section. When it is decided that the verification data received by the reception means is invalid, the storage control means does not store the received verification data into the verification data storage section. When it is decided that the verification data received by the reception means is not invalid (or is valid), the storage control means stores the received verification data into the verification data storage section. As the invalid data storage section, which stores invalid data having invalid verification data registered therein, and the decision means, which decides whether the verification data received by the reception means is invalid or not, are provided, the protection process is executed when invalid verification data is not used. This makes it possible to keep the security level of data protection high.

In the data processing apparatus according to the present invention, the verification data may be a password. As mentioned above, the protection control means permits execution of the data protection process when a verification password upon reception of settings on the protection process is stored in the verification data storage section. At the time of executing the data protection process, user verification is executed upon reception of settings on the protection process based on the password stored in the verification data storage section. The protection control means can prevent the use of the default password, and the decision means can prevent the use of an invalid password which is easily predicted, so that the security level of data protection can be kept high.

The above and further objects and features of the invention will more fully be apparent from the following detailed description with accompanying drawings.

BRIEF DESCRIPTION OF THE DRAWINGS

FIGS. 10A and 10B are diagrams showing examples of a password setting screen;

FIG. 10C is a diagram showing an example of the display screen;

DETAILED DESCRIPTION OF THE INVENTION

Figure 1:
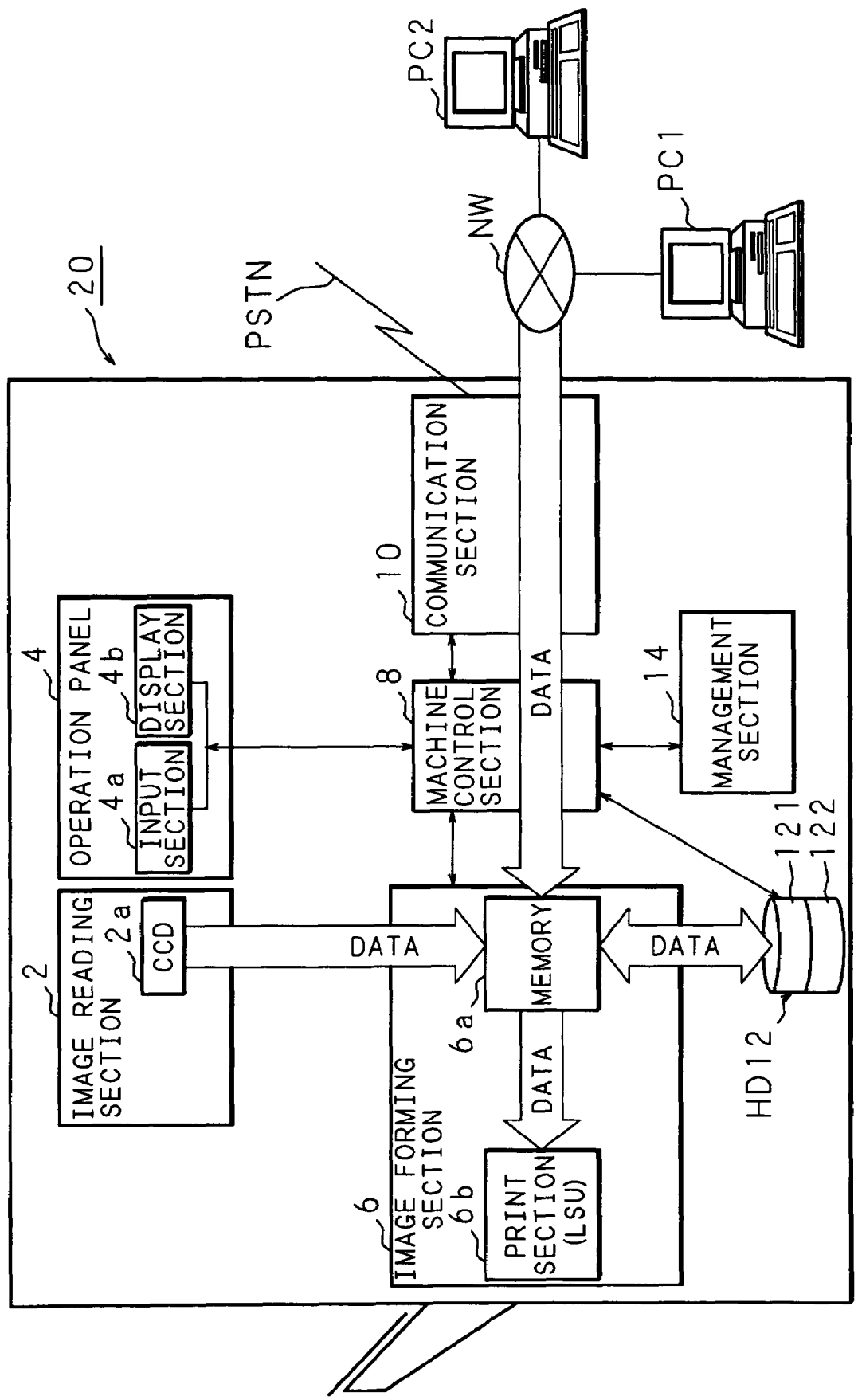
FIG. 1 is a block diagram illustrating one embodiment of an image processing apparatus according to the present invention adapted to a digital multifunction machine.

A preferred embodiment of the present invention will be described in detail below with reference to the accompanying drawings. FIG. 1 is a block diagram illustrating one embodiment of an image processing apparatus according to the present invention adapted to a digital multifunction machine.

A digital multifunction machine 20 as the data processing apparatus of the present invention, which is connected to external devices, such as a personal computer, via a communication cable or a telephone line or so, has a printer function of printing image data received from the external devices, a network scanner function of transmitting image data to an external machine, and a facsimile function of transmitting and receiving facsimile data to and from an external facsimile machine, in addition to a copy function. The digital multifunction machine 20 as the data processing apparatus of the present invention has a function of storing image data into a recording medium as a data processing function, and is capable of printing out stored image data (output process), transmitting image data outside via facsimile communication (output process) or receiving image data from outside, and transmitting image data outside via data communication (output process).

The digital multifunction machine 20 includes, as the main components, an image reading section 2, an operation panel 4, an image forming section 6, a machine control section 8, a communication section 10 which is an interface for external communication, a hard disk (HD) 12 as a non-volatile memory device, and a management section 14. The HD 12 functions as a data storage section which stores image data.

The management section 14, connected to the machine control section 8, comprises a ROM where a control program which is run by the machine control section 8 is stored, and a RAM for storing setting information set through the operation panel 4 and setting information or so on the operations of the individual components of the apparatus. The management section 14 may be a rewritable non-volatile storage medium, such as flash memory or EEPROM.

The image reading section 2, which is connected to the image forming section 6, reads or scans the image of an original by optical image reading means, such as a CCD (Charge Coupled Device) 2a. Under the control of the machine control section 8, the image data of the original scanned by the image reading section 2 is stored, page by page (sheet by sheet of the original), into a memory 6a as a volatile memory device, such as RAM, and the number of sheets of the original (the number of pages) read is stored into the management section 14.

The communication section 10, which is connected to the machine control section 8 and connected to external devices, such as a personal computer, over a network NW like the Internet or a LAN (Local Area Network), as a communication circuit, performs data communication with those external devices, and receives image data, for example. The communication section 10 has a modem and an NCU (Network Control Unit), though not shown, and is so designed as to be able to perform facsimile communication. The modem is connected to a PSTN (Public Switched Telephone Network) via the NCU. The NCU is hardware which performs a circuit control operation of closing and opening a circuit with the PSTN, and connects the modem to the PSTN as needed.

The image forming section 6 has the volatile memory 6a like RAM for storing image data, and a print section (LSU: Laser Scanning Unit) 6b which forms an image based on image data stored in the memory 6a. Although the print section 6b is constructed by an LSU according to the embodiment, the print section 6b may be a printer of an ink jet type or the like.

Figure 2:
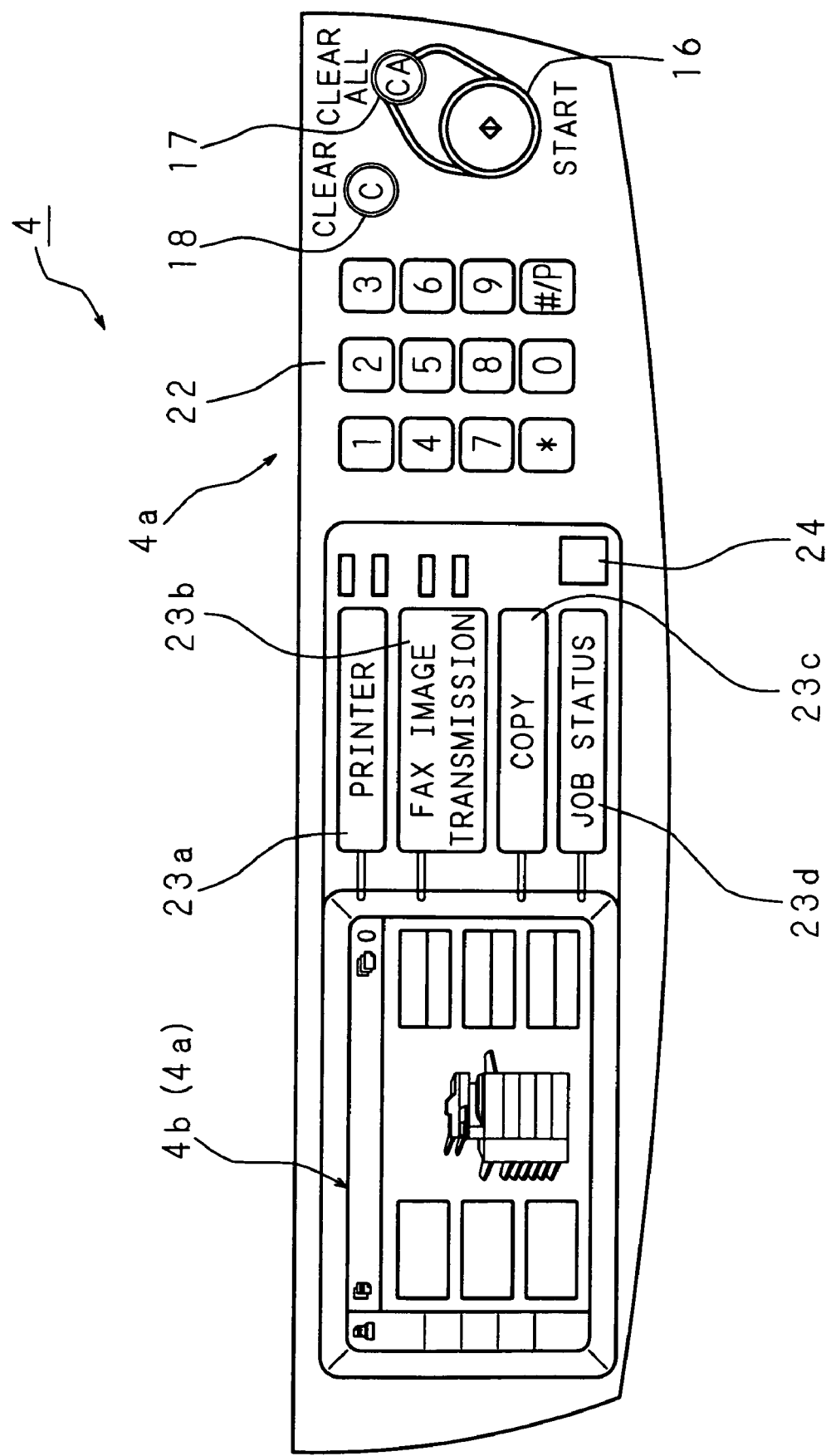
FIG. 2 is an exemplary diagram showing a structural example of an operation panel when the image processing apparatus according to the present invention is adapted to a digital multifunction machine.

A structural example of the operation panel 4, which comprises an input section 4a and a display section 4b, will be described referring to an exemplary diagram in FIG. 2. The operation panel 4 having the input section 4a and the display section 4b is connected to the machine control section 8. The display section 4b is constructed by a dot matrix type liquid crystal panel, and guides and displays information of which the digital multifunction machine 20 should notify a user, in detail. A transparent touch panel is provided on the screen of the liquid crystal panel of the display section 4b, so that as the touch panel is operated according to information to be displayed on the liquid crystal panel, corresponding information is input as instruction information. That is, the display section 4b also functions as a part of the input section 4a.

Keys are laid out, adjacent to the liquid crystal panel, at the input section 4a. The keys include a start key 16 to instruct the start of copying, a clear all (CA) key 17 for interrupting an undergoing process, a clear key 18 to clear the contents of an indicated mode, ten keys 22 for indicating the number of copies, etc., mode (printer, FAX/image transmission, copy) change keys 23a, 23b and 23c, and a user setting key 24. Further included is a job status key 23d for checking the process status of a current job and the old print status of printing which has been done.

The machine control section 8, which is comprised of, for example, a CPU (Central Processing Unit), controls the operations of the individual units (individual sections) of the digital multifunction machine 20, such as the operation panel 4, the image forming section 6, the communication section 10 and the HD 12, according to a control program stored in advance in the management section 14. The machine control section 8 controls the individual units to execute data processing according to an instruction or information input by the user operating the individual keys of the input section 4a provided at the operation panel 4, and sends information on the status of the digital multifunction machine 20 and information to be notified to the user, and the like to the display section 4b.

The machine control section 8 also performs controls, such as input control of image data from the image reading section 2, input control of image data from outside via the communication section 10, input/output control of input image data with respect to the memory 6a and the HD 12, and output control of image data from the image forming section 6 or the communication section 10.

The HD 12, connected to the image forming section 6 and the machine control section 8, stores image data which is input from the image reading section 2 or the communication section 10 to be formed by the image forming section 6, and image data to be transmitted to the outside by facsimile communication or data communication via the communication section 10. The details of the HD 12 will be discussed later.

Through the operation of the input section 4a, the digital multifunction machine 20 as the data processing apparatus of the present invention is set with each of the copy function, the printer function, the network scanner function and the facsimile (FAX) function, and information on the set function is stored into the management section 14 by the machine control section 8. Based on the information stored in the management section 14, the machine control section 8 controls the operations of the individual components of the apparatus, executes processes corresponding to the respective functions, and performs input/output control on image data with respect to the memory 6a and the HD 12 or so.

A description will now be given of the operations of the digital multifunction machine 20 as the data processing apparatus of the present invention when the digital multifunction machine 20 is used as a copy machine, a printer, a network scanner and a FAX, respectively.

When the digital multifunction machine 20 is used as a copy machine by the functional setting through the input section 4a, the machine control section 8 stores image data of an original, read or scanned by the image reading section 2, into the volatile memory 6a temporarily and also into the HD 12. To scan plural sheets (plural pages) of the original, the machine control section 8 repeats a similar scanning and storage process by the number of sheets (plural pages) of the original.

Next, the machine control section 8 reads the image data stored in the HD 12, temporarily stores the image data into the memory 6a, sends the image data stored in the memory 6a to the print section 6b, and performs printing process based on information, such as the density and the sheet size, preset through the operation of the operation panel 4. To print the image data stored in the HD 12 plural sheets (plural pages), the machine control section 8 repeats a similar reading and printing process by the number of sheets of the original on which the image is formed.

The processes of the digital multifunction machine 20 whose function is set as a copy machine are executed as the machine control section 8 controls the operations of the individual components of the apparatus based on the control program stored in the management section 14.

As mentioned earlier, the communication section 10 is connected to the network NW by a communication cable or so. Therefore, the communication section 10 can receive image data through data communication from personal computers PC1 and PC2, connected to the network NW. When the communication section 10 receives image data from the personal computer PC1, PC2, the machine control section 8 stores the image data into the memory 6a temporarily and also into the HD 12.

Next, the machine control section 8 reads the image data stored in the HD 12, temporarily stores the image data into the memory 6a, sends the image data stored in the memory 6a to the print section 6b, and performs printing process based on information, such as the density and the sheet size, preset through the operation of the operation panel 4.

The processes of the digital multifunction machine 20 whose function is set as a printer are executed as the machine control section 8 controls the operations of the individual components of the apparatus based on the control program stored in the management section 14.

The image data of the original scanned by the image reading section 2 is sent to the designated personal computer PC1, PC2 over the network NW from the communication section 10. As in the case of the copy function, the machine control section 8 stores the image data, scanned by the image reading section 2, into the volatile memory 6a temporarily and also into the HD 12. Next, the machine control section 8 reads the image data stored in the HD 12, temporarily stores the image data into the memory 6a, establishes communication with, for example, the personal computer PC1 set through the operation of the operation panel 4, then sends the image data stored in the memory 6a to the communication section 10 which in turn sends the image data to the destination personal computer PC1 over the network NW.

The processes of the digital multifunction machine 20 whose function is set as a network scanner are executed as the machine control section 8 controls the operations of the individual components of the apparatus based on the control program stored in the management section 14. The communication section 10 is connected to a PSTN as well as the network NW, so that similar processes are executed by the machine control section 8 when the digital multifunction machine 20 is used as a facsimile machine.

Although the foregoing description of the embodiment has been given of the digital multifunction machine 20 equipped with a hard disk as a storage medium to store image data, the invention is not limited to this case and can also be adapted to a case where a hard disk is detached from the digital multifunction machine 20 and a case where the digital multifunction machine 20 is equipped with a non-volatile memory which can hold image data stored therein even when power is cut off, a memory with a backup capability or any other storage medium using a magnetic storage medium.

The following will discuss an electronic filing function using the HD 12 provided at the digital multifunction machine 20 as the data processing apparatus of the present invention. The HD 12 is separated into two data storage areas, a first memory section 121 and a second memory section 122, as shown in FIG. 1. Image data stored in the first memory section 121 is read into the memory 6a, and is sent to the print section 6b from the memory 6a to be printed on a print sheet or so under the control of the machine control section 8 according to the operation of the operation panel 4. When an image is formed this way, history information including the order in which printing has been done or the print dates or so, and image data itself are stored in the first memory section 121.

In case where printing of the image data stored in the first memory section 121 has been done once but an image should be formed again from the same image data due to an insufficient number of prints set, paper jamming or the like, information about printing is set through the operation of the operation panel 4 or is set through the personal computer PC1, PC2 or so connected to the network, the set information is sent to the digital multifunction machine 20, and then the image data stored in the first memory section 121 is output again to the image forming section 6 to form an image under the control of the machine control section 8 based on each setting.

The second memory section 122 is an area to store the image data stored in the first memory section 121 for each data type (hereinafter called "file type"), for example, or managed for each of the functions, such as copy, printer, network scanner and FAX. When a given period passes after inputting of the image data to the digital multifunction machine 20 or when a predetermined operational input to the operation panel 4 is made, the image data is arranged and stored in the second memory section 122 under the control of the machine control section 8. To form the image of the image data stored in the second memory section 122, the image data is read from the second memory section 122 and temporarily stored into the memory 6a, and the image data stored in the memory 6a is sent to the print section 6b to be printed on a copy sheet or so under the control of the machine control section 8 according to the operation of the operation panel 4.

The memory area of the first memory section 121 is set smaller than the memory area of the second memory section 122. If the first memory section 121 does not have a sufficient area (memory area) to store data, therefore, the image data stored in the first memory section 121 should be erased from older one based on the history information or updated with newly input image data, or image data a predetermined time old in the first memory section 121 should be automatically erased under the control of the machine control section 8. The image data stored in the first memory section 121 can be stored in the second memory section 122 under the control of the machine control section 8.

The image data stored in the second memory section 122 is arranged and stored in the manner mentioned above. For example, the second memory section 122 has a plurality of folders separated for the respective file types of image data, and the machine control section 8 arranges and stores image data according to the type. The image data stored in the second memory section 122 is not erased unless information instructing erasure is set through the operation of the operation panel 4. When the memory capacity of the second memory section 122 reaches the capacity limit, however, the machine control section 8 displays information about that effect on the display section 4b to inform the user. Accordingly, operating the operation panel 4 the user can increase the memory capacity available by, for example, erasing image data, adding an HD or replacing the existing HD with a HD having a larger memory capacity, thereby newly securing or adding an empty memory area.

The digital multifunction machine 20 as the data processing apparatus of the present invention has an electronic filing function, so that when printing of data in the first memory section 121 or printing of data in the second memory section 122 is carried out, the image data stored in the HD 12 is sent to the image forming section 6 to form an image under the control of the machine control section 8. The image data stored in the first memory section 121 is arranged and stored in the second memory section 122 after a given period of time by the machine control section 8.

A description will now be given of a case where a data security kit is installed into the digital multifunction machine 20 as the data processing apparatus of the present invention later or has been installed into the digital multifunction machine 20 in an inoperable state but is set to an operational state at a certain point of time.

With the data security kit being operational, with regard to image data whose printing has been done, for example, the image data stored in the HD 12 is overwritten with bit data consisting of "0" or random bit data to erase the image data (hereinafter called "overwrite erasure") or the image data is encrypted so as to be hard to read, is then stored and is subjected to overwrite erasure to secure the security of the image data. In the embodiment, both encryption and overwrite erasure are carried out, but of course one of the processes alone is possible.

Figure 3:
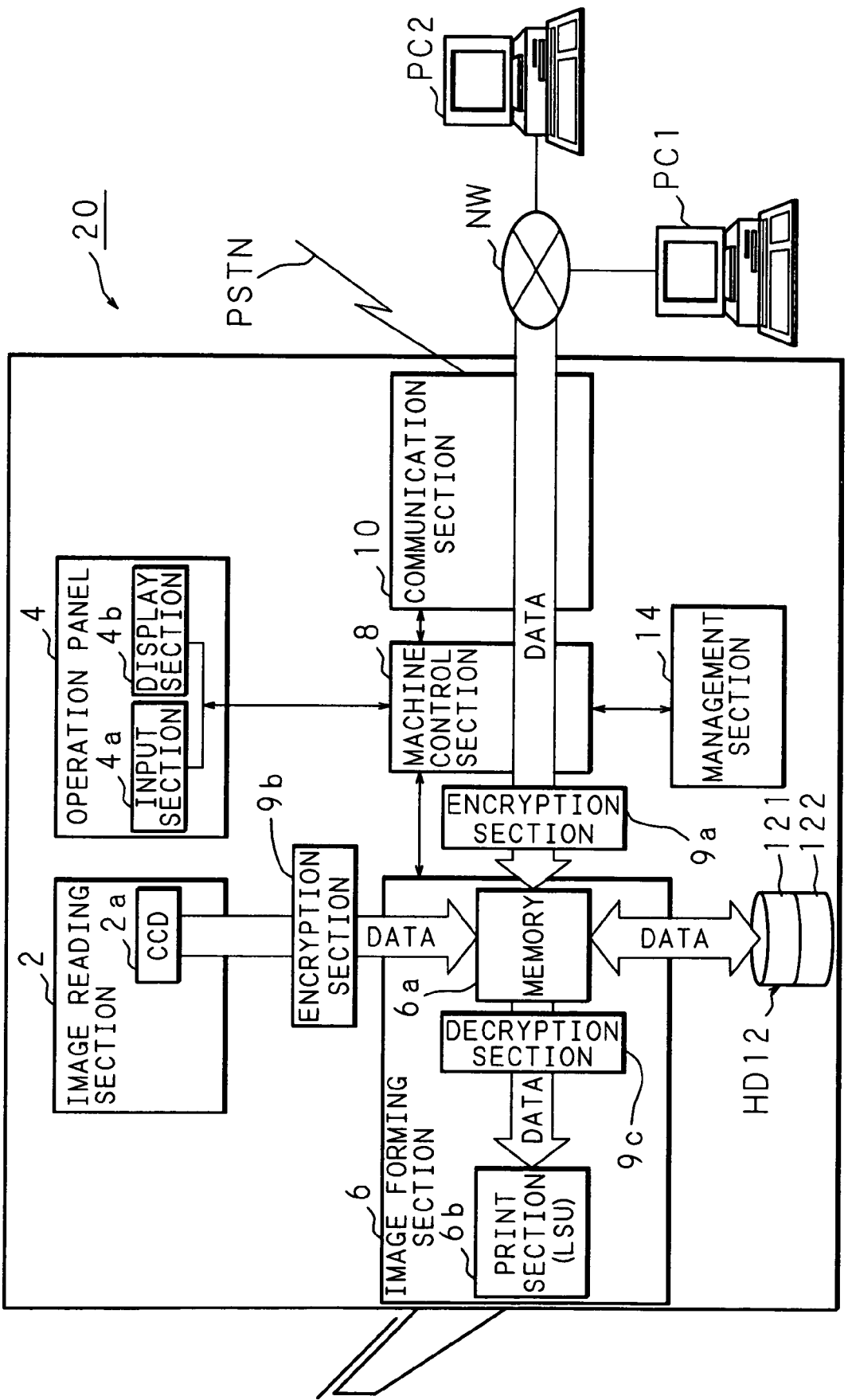
FIG. 3 is a block diagram showing the functional structure when a data security kit is installed in the digital multifunction machine as the image processing apparatus of the present invention.

FIG. 3 is a block diagram showing the functional structure when the data security kit is installed in the digital multifunction machine 20 as the image processing apparatus of the present invention. Encryption sections 9a and 9b and a decryption section 9c are added as new functional blocks to the structure shown in FIG. 1. The encryption section 9a is provided to encrypt image data received by the communication section 10 and set to the memory 6a, the encryption section 9b is provided to encrypt image data scanned by the image reading section 2 and set to the memory 6a, and the decryption section 9c is provided to decrypt and restore encrypted image data to be sent to the print section 6b of the image forming section 6 into original image data. As the other structure is the same as the corresponding structure shown in FIG. 1, its description will be omitted.

The encryption sections 9a and 9b and the decryption section 9c may be option boards which, as hardware, perform encryption and decryption, or may be plug-in software which perform software-based encryption and decryption. In case of using plug-in software, the plug-in software can be added by adding a ROM holding the plug-in software to the management section 14 or storing the plug-in software received over the network NW into the management section 14, and can be run by the machine control section 8. It is also possible to add plug-in software to allow the machine control section 8 to execute overwrite erasure.

The image data input from the image reading section 2 or the communication section 10 over the network NW is encrypted by the encryption section 9b or 9a of the data security kit, and is then stored into the memory 6a. When the encrypted image data stored in the memory 6a is output to the print section 6b, the image data is decrypted and restored into the original image data by the decryption section 9c.

In case where the encrypted image data stored in the memory 6a is stored into the HD 12, the image data is stored encrypted. The encrypted image data stored in the HD 12, after the above-described output process, is subjected to overwrite erasure by the machine control section 8. Therefore, the digital multifunction machine 20 as the data processing apparatus of the present invention provides security protection of image data undergone image processing.

Not illustrated in FIG. 3, however, when image data is sent from the digital multifunction machine 20 to external devices, the encrypted image data may be sent as it is or the image data after decryption may be sent.

Figure 4:
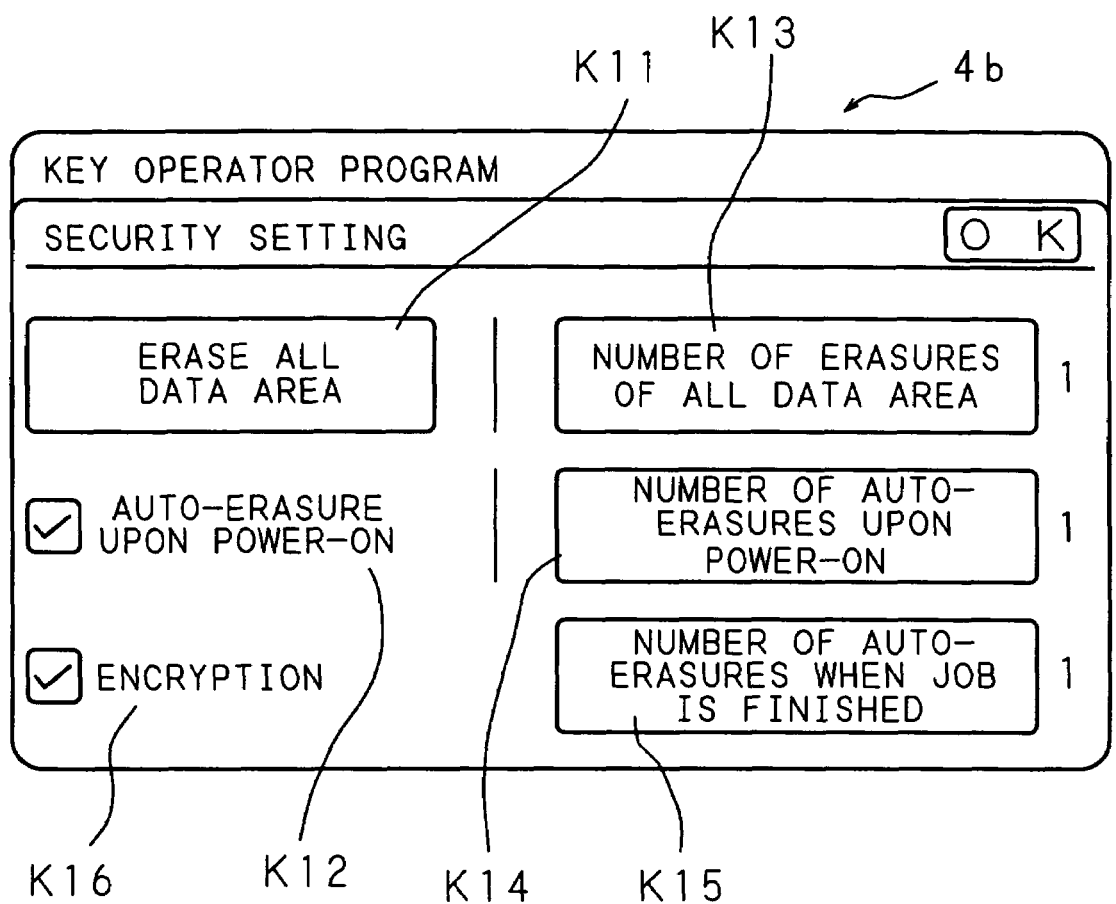
FIG. 4 is an exemplary diagram of a display screen of a display section for detailed setting in the operation of an "image data erasing process" at the time the copy function of the digital multifunction machine as the image processing apparatus of the present invention is set.
Figure 5:
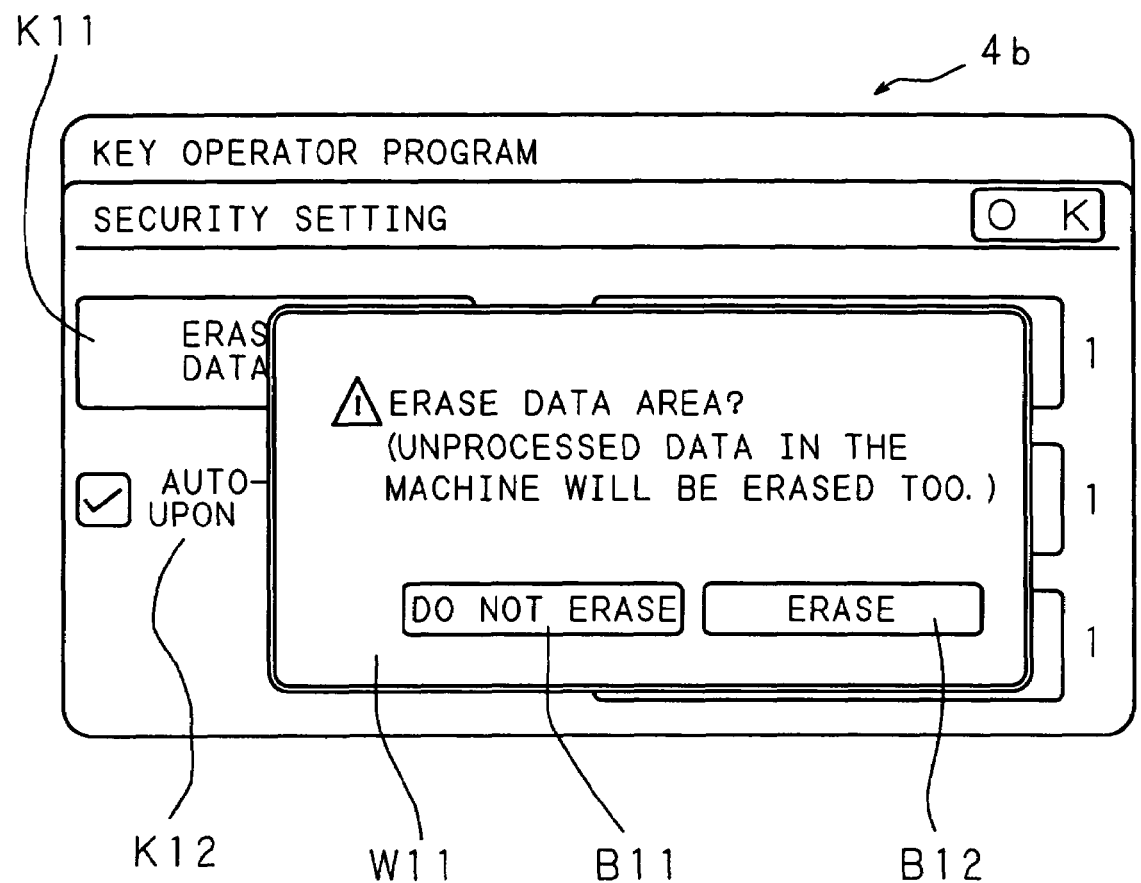
FIG. 5 is an exemplary diagram of a display screen of the display section when a confirmation window for data erasure is displayed in the operation of the "image data erasing process" at the time the copy function of the digital multifunction machine as the image processing apparatus of the present invention is set.
Figure 6:
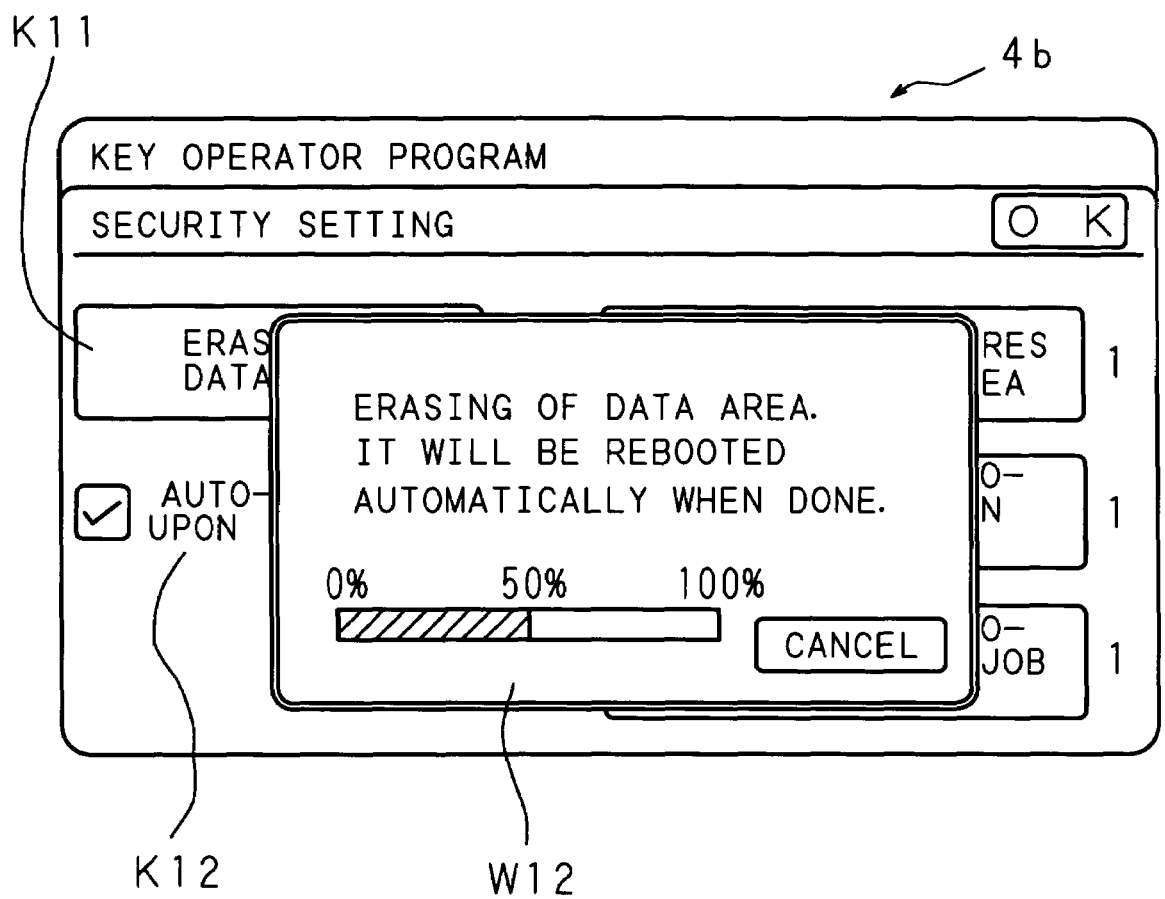
FIG. 6 is an exemplary diagram of a display screen of the display section when the level of the progress of a work of data erasure in a hard disk is displayed in the operation of the "image data erasing process" at the time the copy function of the digital multifunction machine as the image processing apparatus of the present invention is set.
Figure 7:
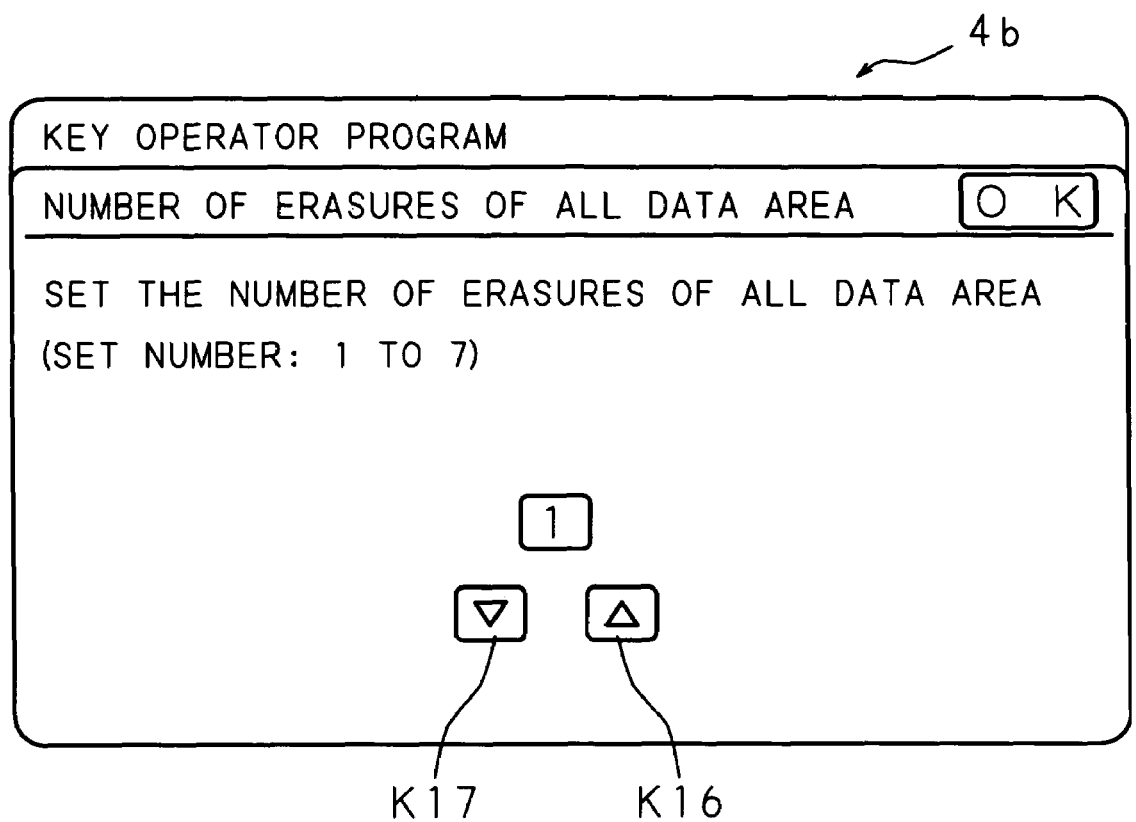
FIG. 7 is an exemplary diagram of the display screen of the display section of a setting screen for "the number of auto-erasures when job is done" at the time the copy function of the digital multifunction machine as the image processing apparatus of the present invention is set.

An operation and setting for an "image data erasing process" through overwrite erasure will be described referring to exemplary diagrams of the display screen of the display section 4b in FIGS. 4 to 7. FIG. 4 shows an example of a security setting screen, FIG. 5 shows an example of a confirmation window for data erasure, FIG. 6 shows an example of a display screen showing the progress status of a data erasing process, and FIG. 7 shows an example of a screen for setting the number of times of erasing all data areas, and those screens are displayed on the display section 4b.

The display screen of the display section 4b shown in FIG. 4 shows an "erase all data area" key K11 for giving an instruction to forcibly erase data stored in the HD 12 (first memory section 121 and second memory section 122) at a given timing, an "auto-erasure upon power-on" key K12 for making setting to execute erasure of all data stored in the HD 12 every time the digital multifunction machine 20 is powered on, and an "encryption" key K16 for making setting to execute encryption. When the "auto-erasure upon power-on" key K12 or the "encryption" key 16 is depressed (touched), a check mark "√" is displayed in a check box provided next to the key. In the default state, both keys are set on and check marks are shown.

The display screen of the display section 4b shown in FIG. 4 further shows a "number of erasures of all data area" key K13 for setting the number of erasures of "all data area erasure", a "number of auto-erasures upon power-on" key K14 for setting the number of erasures of "auto-erasure upon power-on", and a "number of auto-erasures when job is finished" key K15 for setting the number of erasures at the time of erasing only image data stored in the HD 12 (first memory section 121 and/or second memory section 122) after the image data undergoes the output process.

Shown to the right of the "number of erasures of all data area" key K13, the "number of auto-erasures upon power-on" key K14, and the "number of auto-erasures when job is finished" key K15 are numbers set by the operations of the associated keys. The default values of the "number of erasures of all data area" key K13 and the "number of auto-erasures when job is finished" key K15 are "1", and the default value of the "number of auto-erasures upon power-on" key K14 is "0". In the diagram, the "number of auto-erasures upon power-on" is set to "1".

When the number of erasures suitable for the security level is set by the operation of each of the keys, image data stored in the HD 12 (first memory section 121 and/or second memory section 122) is repeatedly erased by the set number of erasures by the machine control section 8. This makes it possible to set the number of erasures according to the security level required at the site of the digital multifunction machine 20 as the data processing apparatus of the present invention. The operation of executing erasure of all image data stored in the HD 12 at a given timing through the operation of the "erase all data area" key K11 is very effective when one wants to erase important data with an extremely high security level immediately after it is printed out.

At the time erasure of all image data stored in the HD 12 is carried out by depressing (touching) the "erase all data area" key K11 on the display screen of the display section 4b shown in FIG. 4, a confirmation window W11 is displayed by the machine control section 8 at nearly the center of the display screen of the display section 4b as shown in FIG. 5. The confirmation window W11 shows a "DO NOT ERASE" button B11 and an "ERASE" button B12, so that when the "ERASE" button B12 is depressed (touched), erasure of data stored in the HD 12 is started by the machine control section 8.

When erasure of data stored in the HD 12 is actually started in the above-described manner, the machine control section 8 displays a window W12 for displaying the progress status of the process on the display screen of the display section 4b.

When the "number of erasures of all data area" key K13, the "number of auto-erasures when job is finished" key K15 or the "number of auto-erasures upon power-on" key K14 is depressed (touched) on the display screen of the display section 4b shown in FIG. 4, the machine control section 8 displays a setting screen for the "number of erasures of all data area", the "number of auto-erasures when job is finished" or the "number of auto-erasures upon power-on" K14 on the display screen of the display section 4b. FIG. 7 shows an example of the display screen of the display section 4b when the "number of erasures of all data area" key K13 is depressed (touched).

When the "number of erasures of all data area" key K13 is depressed (touched), for example, a "DOWN" key K17 and an "UP" key K18 are displayed, as shown in FIG. 7, so that the number of erasures can be set arbitrarily by operating either key. When the "number of auto-erasures when job is finished" key K15 or the "number of auto-erasures upon power-on" key K14 is depressed (touched) on the display screen of the display section 4b shown in FIG. 4, the number of erasures can be set arbitrarily as done in the case of depressing (touching) the "number of erasures of all data area" key K13.

With regard to the process of the "auto-erasures when job is finished", however, the number which is automatically set when the "image data erasing function" becomes operable by the installment of the data security kit in the digital multifunction machine 20, i.e., the default value of "1", is set as the number of auto-erasures, regardless of whether the "number of auto-erasures when job is finished" key K15 is depressed (touched) or not.

The individual display screens are stored in, for example, the management section 14 and are displayed on the display section 4b under the control of the machine control section 8. When any of various keys set on the display screen is operated, the process or the update of setting or so according to the operation is executed under the control of the machine control section 8.

It is preferable that the setting of individual functions of the data security kit should be done according to the security level demanded at the site of the digital multifunction machine 20 when the data security kit is installed in the digital multifunction machine 20 and the "image data erasing function" becomes operable. The process of erasing all data stored in the HD 12 can be performed, as needed, by depressing (touching) the "erase all data area" key K11.

It is preferable that the setting on the protection process, such as the aforementioned encryption and erasure (overwrite erasure), should be accepted only when a user is verified through user verification using verification data like a password. The digital multifunction machine (data processing apparatus) 20 executes the output process (print-out, data transmission, facsimile transmission) and the protection process (encryption and overwrite erasure) of data stored in the HD (data storage section) 12, and executes user verification based on a password when the password (verification data) is stored in the management section (verification data storage section) 14 and setting of the protection process on security is accepted by the machine control section 8.

The machine control section 8 operates as means for permitting or inhibiting execution of encryption and overwrite erasure according to whether a password is stored in the management section 14 or not. When a default password (e.g., "0000") is stored in the management section 14 beforehand, the machine control section 8 permits or inhibits execution of encryption and overwrite erasure according to whether the password has been changed from the default one (e.g., "0000") or not. Here, the default password is the one that is used when a user makes not designation, and is set to the default at the time of shipment. When the password is reset, it is set back to the default.

When a password is not stored in the management section 14 before execution of the protection process, the operation panel 4 operates as means for receiving a password and the machine control section 8 operates as means for storing the password received at the operation panel 4 into the management section 14, and permits or inhibits execution of the protection process according to whether the password is stored in the management section 14.

Also stored in the management section 14 is invalid password information (invalid data) where an invalid password which is easily predicted, such as "1111" or "1234", is registered. The machine control section 8 operates as means for deciding whether the password received at the operation panel 4 is invalid or not based on the invalid password information. When the password received at the operation panel 4 is invalid, the machine control section 8 does not store the password into the management section 14 and receives a password again.

The digital multifunction machine 20, when used as a printer, a network scanner or a facsimile, can perform the same processes as performed when it is used as a copy machine.

Figure 8:
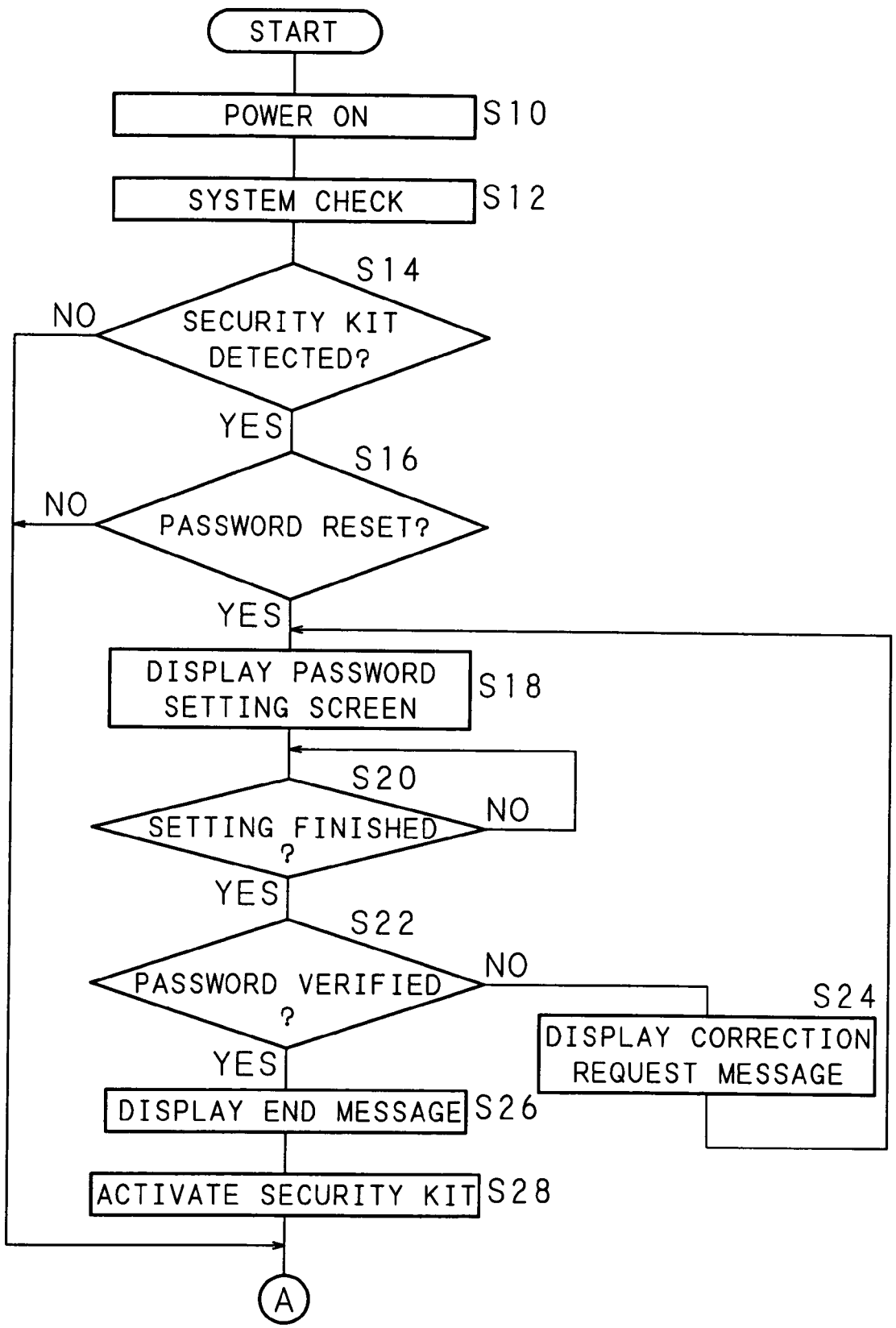
FIG. 8 is a flowchart illustrating a sequence of procedures when a copy function as image processing is set, as one example of a sequence of procedures of erasing image data in the hard disk in the digital multifunction machine as the image processing apparatus of the present invention.
Figure 11:
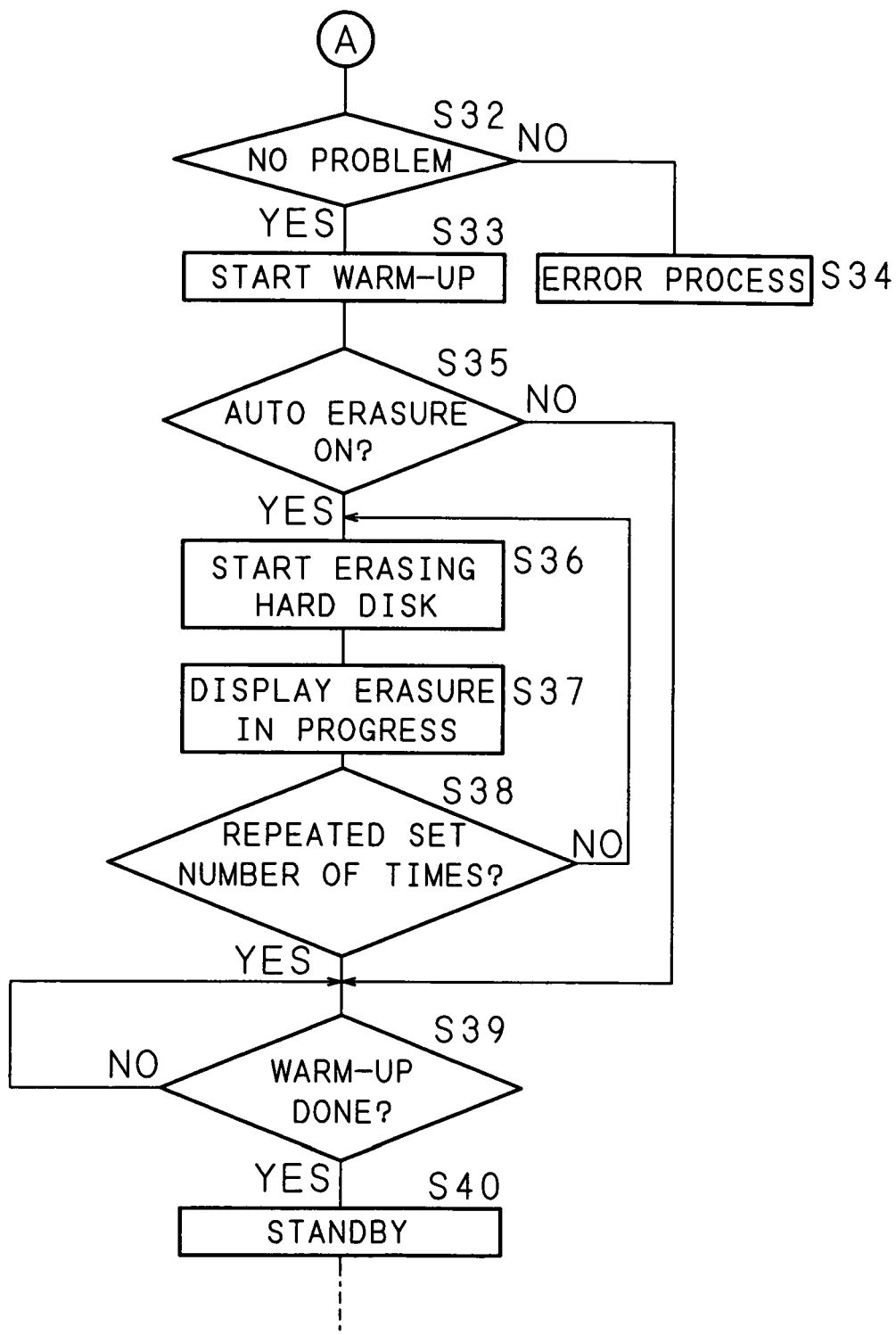
FIG. 11 is a flowchart illustrating a sequence of procedures when the copy function as image processing is set, as one example of a sequence of procedures of erasing image data in the hard disk in the digital multifunction machine as the image processing apparatus of the present invention.
Figure 12:
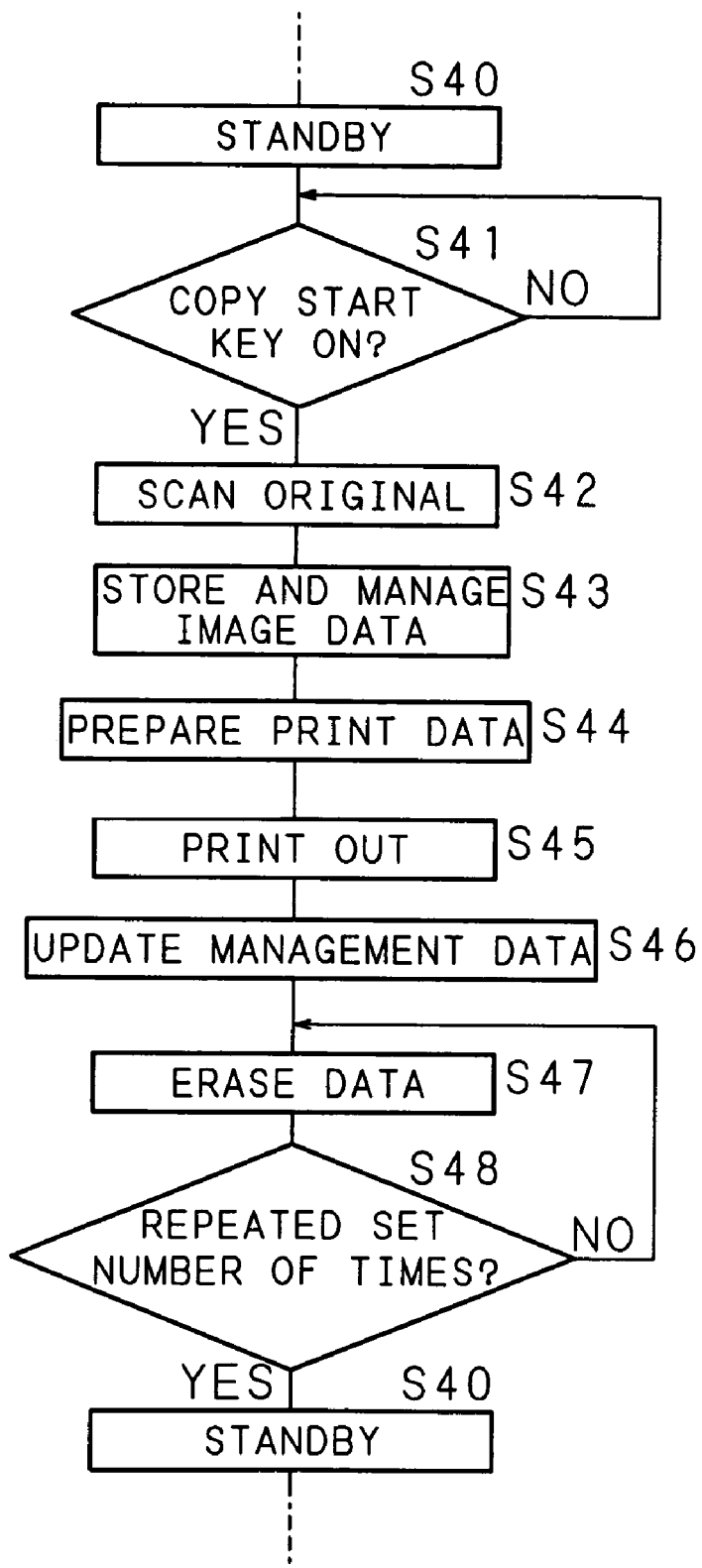
FIG. 12 is a flowchart illustrating a sequence of procedures when the copy function as image processing is set, as one example of the sequence of procedures of erasing image data in the hard disk in the digital multifunction machine as the image processing apparatus of the present invention.

A sequence of procedures of erasing image data from the HD 12 of the digital multifunction machine 20 as the data processing apparatus of the present invention in a case where the copy function is set as image processing, for example, will now be discussed referring to flowcharts in FIGS. 8, 9, 11 and 12. FIGS. 8, 11 and 12 show examples when the data security kit is set operable, while FIG. 9 shows an example when the data security kit is set operable during operation.

When the digital multifunction machine 20 is powered on (step S10 in FIG. 8), the machine control section 8 performs a system check of the statuses of the individual components of the apparatus (step S12 in FIG. 8). When the data security kit is detected (YES at step S14 in FIG. 8), the machine control section 8 checks if a password stored in the management section 14 is reset to the default. Or, when the security function is set on through the operation of the operation panel 4 (YES at step S11 in FIG. 9), the machine control section 8 checks if a password stored in the management section 14 is reset to the default.

Figure 9:
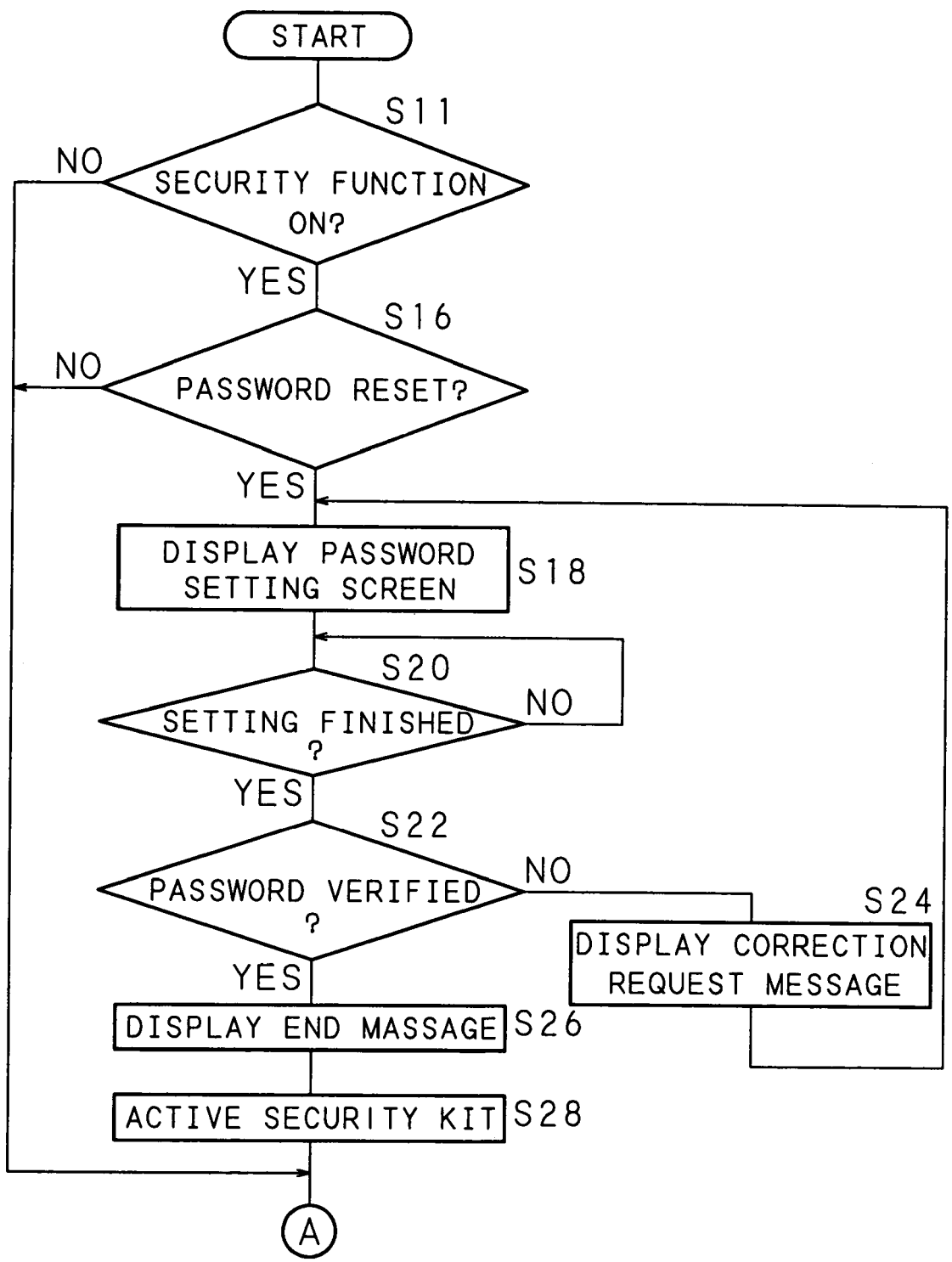
FIG. 9 is a flowchart illustrating another sequence of procedures when the copy function as image processing is set, as one example of the sequence of procedures of erasing image data in the hard disk in the digital multifunction machine as the image processing apparatus of the present invention.

The following processes are common to FIGS. 8 and 9. When the password is reset to the default (YES at step S16, the machine control section 8 reads a password setting screen from the management section 14 and displays the screen on the display section 4*b* (step S18). FIG. 10A shows an example of the password setting screen where, for example, a number of four digits is received through the ten keys 22 of the input section 4*a*.

When a "SETTING DONE" key is depressed (touched) on the password setting screen (YES at step S20), the machine control section 8 checks if something is wrong about the set password, based on the invalid password information stored in the management section 14. An invalid password which is easily predicted, such as "1111" or "1234", is registered in the invalid password information, so that when the password input on the password setting screen is included in the invalid password information, the machine control section 8 decides that there is something wrong (invalid).

When something is wrong about the password (NO at step S22), the machine control section 8 reads a password setting screen containing a correction message from the management section 14 and displays the screen on the display section 4*b* (step S24). FIG. 10B shows an example of the password setting screen where, for example, a number of four digits is received through the ten keys 22 of the input section 4*a* as done in the case of the password setting screen shown in FIG. 10A.

When nothing is wrong about the password (YES at step S22), the machine control section 8 displays an end message stored in the management section 14 on the display section 4*b* (step S26). FIG. 10C shows an example of the password setting screen containing the end message. When the "OK" key on the display screen shown in FIG. 10C is depressed (touched), the machine control section 8 activates the security function (step S28). For example, the machine control section 8 sets the setting of the "activation"/"stop" of the security function set in the management section 14 to "activation".

A description will now be given of an erasing process after power-on shown in FIG. 8. When the data security kit is not detected (NO at step S14) or the password has not been reset (NO at step S16) through the system check (step S12 in FIG. 8), or when no abnormality occurs (YES at step S32 in FIG. 11) after the data security kit is activated (step S28), the machine control section 8 starts warming up the individual components so that the digital multifunction machine 20 can perform a predetermined operation (step S33).

When an abnormality is detected as a result of checking the individual components (NO at step S32), the machine control section 8 performs a predetermined error process corresponding to the detected abnormality (step S34). When an abnormality has occurred in the display section 4*b*, for example, a process of displaying a window-containing a message indicating the occurrence of an abnormality in the display section 4*b* and prompting a user of acknowledgement of the event is possible as the error process.

In initiating the warm-up operation (step S33), the machine control section 8 checks whether the "auto-erasure upon power-on" for initializing the HD 12 when the power is given is set (ON) or not (step S35). The setting of "auto-erasure upon power-on" is done by depressing (touching) the "auto-erasure upon power-on" key K12 on the display screen of the display section 4*b* shown in FIG. 4, as mentioned earlier.

When "auto-erasure upon power-on" is set (YES at step S35), the machine control section 8 initiates erasure (overwrite erasure) of the HD 12 (step S36), and displays erasure of the image data stored in the digital multifunction machine 20 in progress (progress status) in a window on the display screen of the display section 4*b* (step S37). At this time, the machine control section 8 repeats erasure (overwrite erasure) of data stored in the HD 12 by the number of erasures preset on the display screen of the display section 4*b* shown in FIGS. 4 and 7 (NO at step S38). This process allows all the image data stored in the HD 12 to be erased (erased in an overwrite erasure mode).

When erasure (overwrite erasure) of data stored in the HD 12 is finished (YES at step S38), or when "auto-erasure upon power-on" is not set (ON) (NO at step S35), the machine control section 8 sets the display screen of the display section 4*b* to the display state of the basic screen, then stands by until warm-up of the individual components is completed (NO at step S39), and goes to the standby state (step S40) when warm-up of the individual components is completed (YES at step S39).

When an original is placed at a set position of the image reading section 2, the copy function for the original is set, then the start key 16 is set on (depressed) (YES at step S41) during the standby mode at step S40, the CCD 2*a* of the image reading section 2 optically scans the original (step S42), and the machine control section 8 temporarily stores image data obtained by the scanning into the memory 6*a* page by page. Then, the machine control section 8 transfers the image data stored in the memory 6*a* to the HD 12 to store the image data into the first memory section 121 (or the second memory section 122 depending on the case), and stores management information (FAT data) about the image data stored in the HD 12 into the management section 14 (step S43).

The machine control section 8 reads the image data stored in the HD 12 from the first memory section 121 of the HD 12 or the second memory section 122 at a timing of image formation (print-out), and stores the image data into the memory 6*a* page by page to prepare for print data (step S44). When necessary image data is stored into the memory 6*a*, the machine control section 8 sends the image data to the print section 6*b* (LSU) to print out the data (step S45).

When the print-out of the image data is confirmed, the machine control section 8 updates the management data (FAT data) stored in the management section 14 as the process on the image data being completed (step S46). When a sequence of printing processes is completed, the machine control section 8 performs data erasure (overwrite erasure) with respect to the memory area in the HD 12 where the image data used in the sequence of printing processes is stored (step S47). In this case, the machine control section 8 also repeats erasure (overwrite erasure) of data stored in the HD 12 by the number of erasures preset on the display screen of the display section 4*b* shown in FIGS. 4 and 7(NO at step S48). After the process is completed (YES at step S48), the digital multifunction machine 20 goes to the standby mode again (step S40). When the data security kit is not detected, however, the erasing process (steps S47 and S48) is not executed.

When the data security kit is off in FIG. 9 (NO at step S11), or when the password has not been reset (NO at step S16), or after the data security kit is activated (step S28), the processes illustrated in FIG. 12 can be executed. When the security function is off, however, the erasing process (steps S47 and S48) is not executed.

The digital multifunction machine 20 as the data processing apparatus of the present invention, even when used as a printer, a network scanner or a FAX, can execute the output process and the protection process of image data in the same way as the machine does when used as a copy machine. When verification data is not stored in the verification data storage section, both of the output process and the protection process can be prohibited.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A data processing apparatus which receives and stores data into a data storage section, performs an output process and a protection process on data stored in said data storage section, and executes verification at a time of accepting setting about said protection process by using default verification data stored in a verification data storage section or verification data changed from said default verification data and stored in said verification data storage section, and comprises:

decision means for deciding whether verification data stored in said verification data storage section has been changed from default verification data or not; and protection control means for permitting execution of said protection process when verification data is changed from said default verification data, inhibiting execution of said protection process when verification data has not been changed from default verification data, according to a result of a decision made by said decision means, wherein the protection control means, when the verification data is changed from default verification data, enables a setting to execute erasure of all data stored in the data storage section every time the data processing apparatus is powered on, wherein the protection control means, when the verification data is not changed from default verification data, does not enable a setting to execute erasure of all data stored in the data storage section every time the data processing apparatus is powered on, and wherein said protection process is an overwrite erasure process wherein the data stored into the data storage section is overwritten with data to erase the stored data.

2. The data processing apparatus according to claim 1, wherein said verification data is a password.

3. A data processing apparatus which receives and stores data into a data storage section, performs an output process and a protection process on data stored in said data storage section, and executes verification when setting of said protection process is accepted and when verification data to be used in verification is stored in a verification data storage section, and comprises:

reception means for receiving verification data when no verification data is stored in said verification data storage section before execution of said protection process;

storage control means for storing said verification data, received by said reception means, into said verification data storage section;

decision means for deciding whether verification data is stored in said verification data storage section or not; and protection control means for permitting execution of said protection process when verification data is stored in said verification data storage section, inhibiting execution of said protection process when no verification data is stored in said verification data storage section, according to a result of a decision made by said decision means, and enabling a setting to execute erasure of all data stored in the data storage section every time the data processing apparatus is powered on, wherein said protection process is an overwrite erasure wherein the data stored into the data storage section is overwritten with data to erase the stored data, the data processing apparatus further comprising:

an invalid data storage section which stores invalid data having invalid verification data registered therein; and decision means for deciding whether said verification data received by said reception means is invalid or not based on invalid data stored in said invalid data storage section, wherein when it is decided that said verification data received by said reception means is invalid, said storage control means does not store said received verification data into said verification data storage section.

4. The data processing apparatus according to claim 3, wherein said verification data is a password.

5. A data processing apparatus comprising:

a data storage section which stores received data;

an execution section which performs a protection process on data stored in said data storage section;

a verification data storage section that stores default verification data or verification data changed from said default verification data, which is used in verification at a time of accepting setting about said protection process; and a controller capable of performing the following operations of:
executing said verification by using default verification data stored in said verification data storage section or verification data changed from said default verification data and stored in said verification data storage section;
deciding whether verification data stored in said verification data storage section has been changed from default verification data or not; and
permitting execution of said protection process when verification data is changed from said default verification data, and inhibiting execution of said protection process when verification data has not been changed from default verification data, according to a result of a decision made by said decision means,
wherein, when the verification data is changed from the default verification data, enabling a setting to execute erasure of all data stored in the data storage section every time the data processing apparatus is powered on,
wherein, when the verification data is not changed from default verification data, not enabling a setting to execute erasure of all data stored in the data storage section every time the data processing apparatus is power on, and
wherein said protection process is an overwrite erasure process wherein the data stored into the data storage section is overwritten with data to erase the stored data.

6. The data processing apparatus according to claim 5, wherein said verification data is a password.

7. A data processing apparatus comprising:
a data storage section which stores received data;
an execution section which performs a protection process on data stored in said data storage section;
a verification data storage section which stores verification data to be used in verification when setting of said protection process on said data is accepted;
a reception section which receives verification data when no verification data is stored in said verification data storage section before execution of said protection process; and a controller capable of performing the following operations of:
storing said verification data, received by said reception section, into said verification data storage section;
deciding whether verification data is stored in said verification data storage section or not;
executing said verification when verification data is stored in said verification data storage section; and
permitting execution of said protection process when verification data is stored in said verification data storage section, inhibiting execution of said protection process when no verification data is stored in said verification data storage section, according to a result of a decision made by said decision means, and enabling a setting to execute erasure of all data stored in the data storage section every time the data processing apparatus is powered on, wherein said protection process is an overwrite erasure wherein the data stored into the data storage section is overwritten with data to erase the stored data, the data processing apparatus further comprising:

an invalid data storage section which stores invalid data having invalid verification data registered therein; and
wherein said controller is capable of performing the following operations of:
deciding whether said verification data received by said reception section is invalid or not based on invalid data stored in said invalid data storage section; and
not storing said verification data received by said reception section into said verification data storage section when it is decided that said received verification data is invalid.

8. The data processing apparatus according to claim 7, wherein said verification data is a password.

9. The data processing apparatus of claim 1, wherein upon receiving a request to perform execution of said protection process, the protection control means inhibits execution of the protection process when the verification data has not been changed from the default verification data.

10. The data processing apparatus of claim 5, wherein upon receiving a request to perform execution of said protection process, the protection control means inhibits execution of the protection process when the verification data has not been changed from the default verification data.

* * * * *